US006425281B1

United States Patent
Sheriff et al.

(10) Patent No.: US 6,425,281 B1
(45) Date of Patent: Jul. 30, 2002

(54) PRESSURE INSENSITIVE GAS CONTROL SYSTEM

(75) Inventors: David P. Sheriff, Anaheim Hills; Chiun Wang, Cerritos, both of CA (US)

(73) Assignee: Unit Instruments, Inc., Yorba Linda, CA (US)

( * ) Notice: Subject to any disclaimer, the term of this patent is extended or adjusted under 35 U.S.C. 154(b) by 0 days.

(21) Appl. No.: 09/616,819

(22) Filed: Jul. 12, 2000

Related U.S. Application Data
(60) Provisional application No. 60/143,478, filed on Jul. 12, 1999.

(51) Int. Cl.[7] .......................... G01F 15/10; G01F 15/04; G01F 27/04; G01F 7/00; G01F 9/00
(52) U.S. Cl. ........................ 73/23.2; 73/1.25; 251/37; 251/118; 137/115.22
(58) Field of Search ................................ 73/23.2, 1.25, 73/1.05, 61.56, 23.51; 251/37, 39, 118; 137/115.22

(56) References Cited

U.S. PATENT DOCUMENTS

| | | | |
|---|---|---|---|
| 3,520,657 A | * 7/1970 | Trumerman .................. 23/230 |
| 4,056,975 A | 11/1977 | LeMay ......................... 73/202 |
| 4,072,043 A | * 2/1978 | Naizer et al. .................. 73/23 |
| 4,304,120 A | 12/1981 | Myers et al. .................. 73/19 |
| 4,455,861 A | * 6/1984 | Alftine .......................... 73/23 |
| 4,480,462 A | * 11/1984 | Miller ........................... 73/37 |
| 4,709,575 A | * 12/1987 | Myers ........................... 73/23 |
| 4,776,213 A | 10/1988 | Blechinger et al. ........... 73/202 |
| 5,041,265 A | * 8/1991 | Koike et al. ................... 422/94 |
| 5,080,131 A | 1/1992 | Ono et al. ................... 137/599 |
| 5,245,857 A | * 9/1993 | Kahl ........................... 73/23.2 |
| 5,255,553 A | 10/1993 | Hale et al. .................... 73/19.1 |
| 5,279,154 A | 1/1994 | Vavre et al. ................. 73/202.5 |
| 5,303,584 A | 4/1994 | Ogasawara et al. ....... 73/204.21 |
| 5,347,847 A | * 9/1994 | Ogden et al. ................... 73/37 |
| 5,542,284 A | * 8/1996 | Layzell et al. ................ 73/23.2 |
| 5,635,626 A | * 6/1997 | Hammond et al. ........... 73/23.2 |
| 5,753,185 A | * 5/1998 | Mathews et al. .............. 422/94 |
| 5,880,352 A | * 3/1999 | Muench ...................... 73/23.2 |
| 5,925,829 A | 7/1999 | Laragione et al. ............ 73/861 |
| 5,929,318 A | * 7/1999 | Smith ......................... 73/23.2 |
| 6,044,701 A | 4/2000 | Doyle et al. ............... 73/202.5 |

FOREIGN PATENT DOCUMENTS

| | | |
|---|---|---|
| EP | 0 501 431 A2 | 9/1992 |
| EP | 0 890 828 A1 | 1/1999 |
| WO | WO 95/17651 | 6/1995 |

OTHER PUBLICATIONS

James H. Doyle, Jr., and Michael J. Doyle, "Mass Flow Control for Critical Process Requirements", Apr., 1985, pp. 1–4.

* cited by examiner

*Primary Examiner*—Hezron Williams
*Assistant Examiner*—David J. Wiggins
(74) *Attorney, Agent, or Firm*—Wolf, Greenfield & Sacks, P.C.

(57) ABSTRACT

A pressure insensitive gas process device that includes a gas sensor and restrictions upstream and downstream of the gas sensor. The restrictions result in pressure drops upstream and downstream of the gas sensor which shield the gas sensor from upstream and downstream pressure changes, respectively, rendering the gas sensor and the entire gas process device insensitive to pressure changes. Gas process devices in which pressure insensitivity may be achieved include mass flow controllers as well as other types of devices.

37 Claims, 9 Drawing Sheets

PRESSURE INSENSITIVE GAS CONTROL SYSTEM

This application claims priority from Provisional application Ser. No. 60/143,478, filed Jul. 12, 1999.

BACKGROUND OF THE INVENTION

1. Field of the Invention

The present invention is directed to gas process devices, such as mass flow meters, mass flow controllers, gas analyzers, etc., and, more particularly, to a gas process device that is insensitive to changes in gas pressure.

2. Related Art

Many industries, such as the semiconductor and pharmaceutical industries, rely on Mass Flow Controllers (MFCs) to precisely control the amount of gas that is supplied to a particular tool or device. For example, in the semiconductor industry, a number of MFCs are typically used to provide selected amounts of gases to a process device or tool. Typically, each MFC has an inlet that is coupled to a particular supply gas. The outlet of each MFC is typically coupled to a common outlet that is shared among a plurality of MFCs and coupled to the process device or tool. In such systems, gas flow stability remains a chronic problem.

For example, pressure changes in the supply of gas to a MFC may change the mass of gas inside the MFC. As the components within the MFC react to the change in mass, they typically over-compensate for the increase or decrease in pressure, resulting in flow instability. This is particularly noticeable for temporary changes in pressure over a short time period, known as transients, and for low flow rates and heavy gases. For example, a pressure transient as small as 5 pounds per square inch (psi) over 100 milliseconds (msec) may have a dramatic effect on flow.

In addition to pressure transients on the inlet side of an MFC due to, for example, insufficient pressure regulation, flow instability may also result from pressure transients on the outlet side of the MFC. In particular, because several MFCs may be interconnected to a common outlet, changes in the flow provided by one MFC which affect the pressure at the common outlet may also affect the performance of other MFCs coupled to the common outlet. Alternatively, or in addition to the afore-mentioned problem, changes in the pressure of the process device or tool to which the common outlet is connected may affect the performance of one or more MFCs connected thereto. Such pressure transients typically result from transition phases in the gas panel (i.e., the collection of components, supply lines, and conduits connected to the process device or tool) and the interaction between various components in the gas panel, such as between different MFCs, between MFCs and pressure regulators, between MFCs and valves, or between MFCs and the process device or tool itself. During such transition phases, process devices, such as MFCs, may compensate for each other, in effect amplifying each other's actions. This results in flow and pressure oscillations, commonly referred to as "cross talk." In the semiconductor industry, the inability to accurately control the flow of gas frequently leads to discarding one or more of the first semiconductor wafers being processed. This is referred to as the "first wafer effect" or "bad first wafer effect."

To avoid problems due to changes in pressure, and, in particular, due to pressure transients, a pressure regulator is frequently added for each fluid process device (e.g., MFC, pressure transducer, etc.) in the gas panel. Although this may mitigate the effect of pressure changes, the use of a pressure regulator for each MFC results in significant cost and maintenance.

SUMMARY

According to one embodiment of the present invention, a gas process device is provided having a gas inlet and a gas outlet. The gas process device includes a first restriction, a second restriction, and a gas sensor, each having an inlet and an outlet. The inlet of the first restriction is fluidly coupled to the gas inlet of the gas process device and the inlet of the gas sensor is fluidly coupled to the outlet of the first restriction. The inlet of the second restriction is fluidly coupled to the outlet of the gas sensor and the outlet of the second restriction is fluidly coupled to the gas outlet of the gas process device. According to a further aspect of this embodiment, the second restriction may be constructed and arranged to provide choked flow of a gas.

According to another embodiment of the present invention, a gas process device is provided having a gas inlet and a gas outlet. The gas process device includes a gas sensor fluidly coupled to the gas inlet and the gas outlet, and first and second means for inducing a pressure drop fluidly coupled between the gas inlet and the gas sensor and between the gas sensor and the gas outlet, respectively. According to a further aspect of this embodiment, the gas sensor may include a thermal mass flow meter.

According to another embodiment of the present invention, a pressure insensitive method of measuring a property of a gas in a gas process device having an inlet and an outlet is provided. The method includes acts of receiving a flow of the gas, dropping the pressure of the gas to produce a first reduced pressure gas, providing the first reduced pressure gas to a gas sensor, measuring a property of the gas with the gas sensor, further dropping the pressure of the gas to produce a second reduced pressure gas and providing the second reduced pressure gas to the outlet.

According to a further embodiment of the present invention, a method for ceasing a flow of a gas in a gas process device having a control valve is provided. The method includes acts of closing an inlet valve upstream of the gas process device, maintaining a predetermined drive to the control valve, and closing an outlet valve downstream of the gas process device when a flow rate of the gas drops below a predetermined value so that the flow of gas is ceased in a controlled manner.

According to another embodiment of the present invention, a method for initiating a gas flow in a gas process device having a control valve, a gas sensor, and a restriction downstream of the control valve and the gas sensor is provided. The method includes acts of equalizing a first pressure upstream of the control valve and a second pressure downstream of the control valve and upstream of the restriction with a third pressure downstream of the restriction, opening an inlet valve upstream of the gas process device and an outlet valve downstream of the gas process device, and opening the control valve to a position corresponding to a desired flow rate so that the flow of gas is initiated in a controlled manner.

BRIEF DESCRIPTION OF THE DRAWING

Preferred, non-limiting embodiments of the present invention will be described by way of example with reference to the accompanying drawings, in which.

DETAILED DESCRIPTION

According to one aspect of the present invention, a gas process device is provided that is substantially insensitive to variations in gas pressure. In one embodiment, the gas process device includes a Mass Flow Controller (MFC) that is substantially insensitive to changes in both inlet and outlet pressure. This embodiment can, for example, eliminate the need for local and redundant pressure regulation required with conventional MFCs to render them insensitive to such pressure changes. Because additional pressure regulation devices are not required, the size, cost, and complexity of the gas process device and related devices, such as gas panels, can be reduced. Moreover, because the size and complexity of the gas process device and related devices can be reduced, maintenance costs associated with the operation of the these devices can also be reduced. Embodiments of the present invention may be used for atmospheric processes as well as vacuum processes.

Although embodiments of the present invention are primarily described in terms of a mass flow controller, it should be appreciated that the present invention is not so limited. In this regard, aspects of the present invention may be used with a variety of gas sensors in which the accuracy of the gas sensor is affected by temporary changes in pressure upstream of the gas sensor, downstream of the gas sensor, or both. For example, embodiments of the present invention may also be used with mass flow meters, gas composition analyzers, and a variety of other types of gas sensors.

Figure 1A:
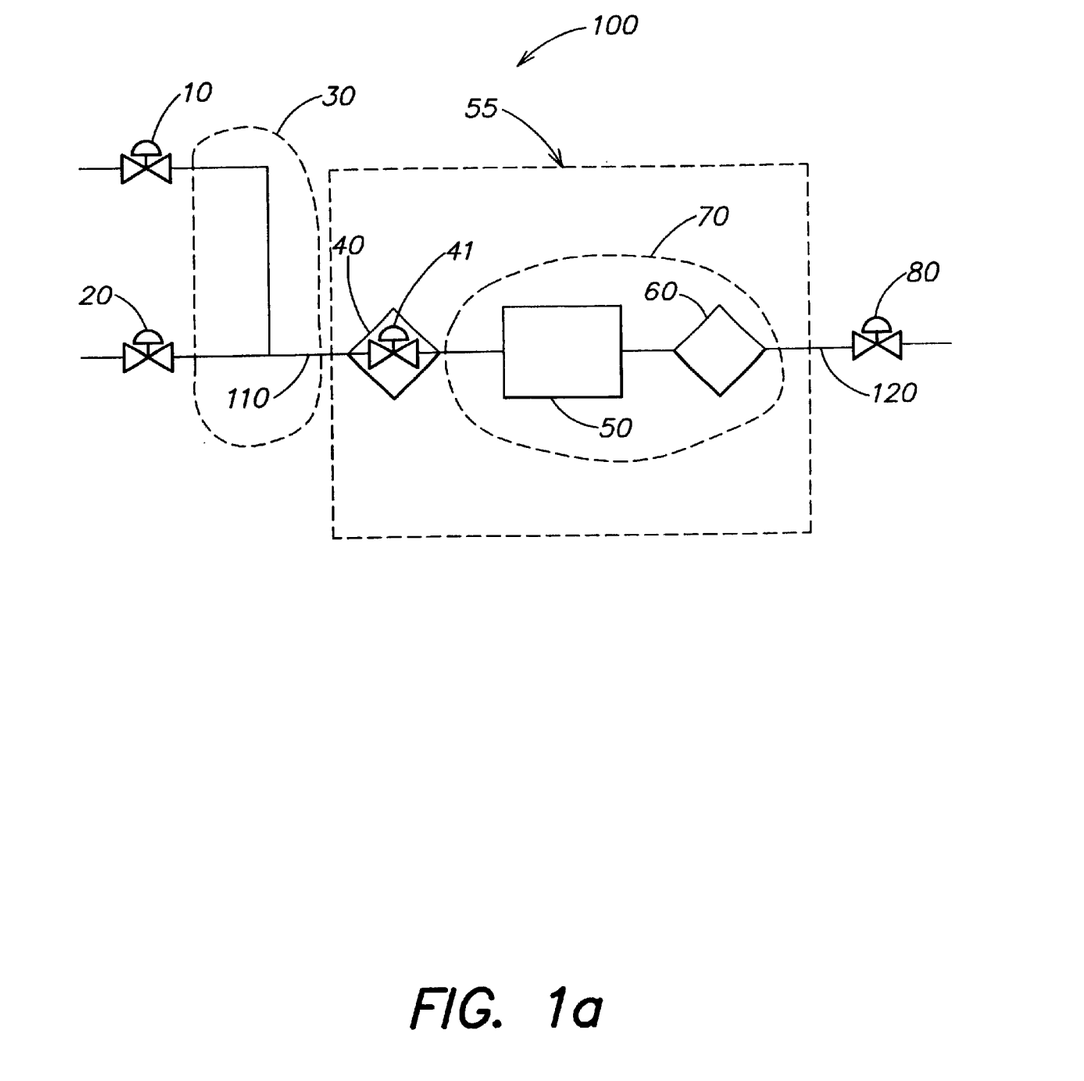
FIG. 1a is a schematic diagram of a gas process device according to one embodiment of the present invention.

FIG. 1a illustrates a gas process device according to one embodiment of the present invention that is disposed in a portion of a gas stick or gas panel 100. Gas process device 55 includes a gas sensor 50 that is fluidly coupled to a first restriction 40 and a second restriction 60 between a gas inlet 110 and a gas outlet 120 of gas process device 55. As used herein, the term restriction refers to any structure or device or collection of structures or devices capable of inducing a pressure drop, from inlet to outlet, of the structure, device, or collection of structures or devices. In the embodiment illustrated in FIG. 1a, an inlet of first restriction 40 is fluidly coupled to gas inlet 110 of gas process device 55, with an outlet of the first restriction being fluidly coupled to an inlet of gas sensor 50. An outlet of gas sensor 50 is fluidly coupled to an inlet of second restriction 60, with an outlet of the second restriction 60 being fluidly coupled to gas outlet 120 of gas process device 55.

According to one aspect of the present invention, Applicants have determined that restrictions 40, 60 may be used to render gas process device 55 insensitive to upstream and/or downstream pressure changes. Specifically, applicants have found that any pressure drop across restrictions 40, 60 is sufficient to reduce the sensitivity of gas process device 55 to pressure changes. For example, when the flow of a gas through restriction 60 is choked, gas process device 55 is rendered substantially insensitive to pressure changes downstream of gas process device 55, and when the flow of gas through restriction 40 is also limited, or is choked, gas process device 55 is also rendered less sensitive to pressure changes upstream of gas process device 55. The exact pressure drop needed to induce choked flow varies with the gas. However, for the vast majority of gases used in the semiconductor manufacturing industry, choked flow is typically achieved when the pressure upstream of restrictions 40, 60 is approximately 2 times the pressure downstream of restrictions 40, 60.

In one embodiment, the pressure drop across restrictions 40, 60 may be greater than that required to induce choked flow to ensure pressure insensitivity. However, it should be appreciated that the present invention is not limited to restrictions providing choked flow, as pressure drops that are less substantial may alternatively be used. For example, applicants have found that pressure drops across restrictions 40, 60 of approximately 1.25 (as expressed as a ratio of upstream to downstream pressure across restrictions 40, 60) or more appreciably reduce the sensitivity of gas process device 55 to pressure changes upstream and downstream therefrom. The preferred pressure drop varies with the properties of the gas flowing through gas process device 55, as well as the pneumatic resistance of restrictions 40, 60. For example, any pneumatic resistance provided by restriction 40 will operate to remove the sharp leading edge of a short duration pressure transient upstream of gas process device 55. In one embodiment, restrictions 40, 60 are operated in a regime where the flow versus pressure behavior is non linear, which improves the dampening effect of restriction 40 to upstream pressure changes and effectively isolates gas process device 55 from any downstream pressure changes.

In the embodiment illustrated in FIG. 1a, restriction 40 may include a control valve 41, although other types of restrictions may be used, as discussed further below. Moreover, gas sensor 50 may include a mass flow meter, a pressure transducer, a gas component analyzer or any other type of gas sensor known in the art. In one embodiment, where restriction 40 includes a control valve 41, and gas sensor 50 is a mass flow meter, control valve 41, the mass flow meter and restriction 60 may be combined in a single device such as a mass flow controller (MFC). The MFC, in turn, may be part of a gas panel 100. It is to be understood that although various aspects of the present invention are predominantly described with reference to the embodiment illustrated in FIG. 1a, the present invention is not so limited. Specifically, the present invention may be embodied in other configurations, such as those illustrated in FIGS. 1b and 1c. For example, in the embodiment illustrated in FIG. 1b, restriction 60 may include a control valve 61 and, in the embodiment illustrated in FIG. 1c, both restriction 40 and restriction 60 may be valves 41, 61, either or both of which may be control valves. Moreover, it should be appreciated that gas sensor 50 may be other than a mass flow meter, as gas sensor 50 may include a gas composition analyzer, a pressure transducer, or a combination of such sensors.

In the embodiment of FIG. 1a, gas panel 100 includes an inlet valve 20 for receiving a process gas, a gas process device 55 configured as a MFC, and an outlet valve 80. The process gas may be a single process gas or a mixture of process gases. Gas outlet valve 80 may, for example, be coupled to a process device or tool or some other common outlet. In the embodiment of FIG. 1a, gas process device 55 is directly coupled to inlet valve 20 and outlet valve 80. However, it should be appreciated that other flow monitoring or control devices also may be present therebetween. Gas panel 100 also may include a purge valve 10, as shown in FIG. 1a. Purge valve 10 can, for example, be actuated to flush gas process device 55 with a purge gas. Typically, during such a purging process, inlet valve 20 would be closed and control valve 40 and outlet valve 80 would be open to purge the flow path. During normal operation, purge valve 10 is typically set to a closed position.

According to one embodiment, process gas may be directly supplied to the gas process device 55 via inlet valve 20 at plant distribution pressure, without the need of a pressure regulator provided therebetween. For example, gas may be supplied at a variety of pressures, with pressures typically being encountered ranging between approximately 5 psi and 100 psi or between approximately 25 psi and 40 psi. Inlet valve 20 may be any gas flow control device compatible with the gas to be used. For example, inlet valve 20 may be a conventional process gas pneumatic shutoff valve that is provided with a manual lockout override for safe maintenance. Similarly, gas outlet valve 80 and purge valve 10 also may be any gas flow control device compatible with the gas to be used, such as a conventional process gas outlet isolation pneumatic shutoff valve. It should be appreciated that valves 10, 20, 80 may be constructed to handle gases that are corrosive, explosive, or potentially damaging in a conventional manner.

Control valve 41 may be any valve capable of controlling the flow of gas to a desired degree of accuracy. For example, control valve 41 may be a proportional metering valve. Alternatively, control valve 41 may be opened to a desired degree to provide a consistent flow rate. Control valve 41 may be disposed before the flow meter (e.g., gas sensor 50) and may operate so it is substantially insensitive to downstream pressure changes. That is, the flow of gas through control valve 41 may be regulated so that the pressure on the inlet side of control valve 41 is sufficiently greater than the pressure on the outlet side of control valve 41 so that the flow of gas through control valve 41 is substantially insensitive to downstream pressure changes. For example, the pressure upstream of control valve 41 may be approximately two times greater than the pressure downstream of control valve 41. Control valve 41 may also be operated so the pressure downstream of control valve 41 is insensitive to upstream pressure changes. For example, the pressure drop across control valve 41 may be sufficient to dampen upstream pressure changes or to render gas process device 55 substantially insensitive to upstream pressure changes. A valve operated such that it is substantially insensitive to pressure changes downstream of the valve is said to be in a choked condition.

The configuration of gas process device 55 illustrated in FIG. 1a is in-contrast to a conventional MFC in which a control valve (e.g., control valve 41) is typically disposed after (i.e., downstream of) the flow meter (e.g., gas sensor 50) on the outlet side of the MFC. In such a conventional arrangement, the control valve cannot reduce the sensitivity of the flow meter to upstream pressure changes.

It should be appreciated that control valve 41 need not shut off completely. In this regard, the present invention may be used with valves that shutoff completely, as well as those that do not. For example, even where control valve 41 leaks in a closed position, the differing pressures in volume 30 (representing the internal volume in the interconnecting passages between valves 10, 20, and 41) and volume 70 (representing the internal volume in the interconnecting passages between valves 41 and 80, including the internal volume of the flow meter, and restriction 60) will equalize in a short amount of time, as described further below. Like the other valves 10, 20, 80 in gas process device 55, control valve 41 may be specifically adapted to the particular type of gas used (e.g., corrosive, explosive, poisonous, etc.).

In the illustrated embodiment of FIG. 1a, where the gas sensor 50 includes a mass flow meter, the flow meter may be any mass flow measurement device that measures the mass flow rate of a gas to a desired degree of accuracy. For example, the flow meter may be a thermal mass flow meter, such as a conventional bypass-type thermal mass flow meter. Where the gas sensor 50 is a thermal bypass mass flow meter, the great amount of industry experience in calibrating thermal bypass-type flow meters to different types of process gases may be used with embodiments of the present invention. Thermal mass flow meters measure mass flow rate based on heat capacity of a gas, thus eliminating the pressure and temperature of the gas as variables. However, even though the pressure of the gas is irrelevant to the mass flow rate measurement, changes of pressure result in changes in mass flow rate during the transition period. It should be appreciated that although gas sensor 50 may include a thermal mass flow meter, the present invention is not limited. Thus, the ability to shield gas sensor 50 from upstream and downstream pressure changes may also be used with other types of mass flow meters, such as pressure-based flow meters, Venturi flow meters, "Corriolus" effect flow meters and volume flow meters such as Doppler and positive displacement piston flow meters.

As discussed above, restrictions 40, 60 may be any device or structure that restricts or otherwise limits a flow of a gas such that the pressure on the inlet side of the restriction is greater than that on the outlet side of the restriction. For example, restrictions 40, 60 may be a filter, a frit, a valve, a baffle, a restrictive orifice or any other device through which the flow rate out of restrictions 40, 60 is substantially independent of the pressure at the outlet of restrictions 40, 60. For example, according to one aspect of the present invention, for a wide variety of different gases this may be achieved by ensuring that the pressure drop across restrictions 40, 60 is approximately greater than half the upstream pressure of the gas. Restrictions 40, 60 may include a filter which in addition to providing a pressure drop can filter particulate contaminants from the process gas stream. Restrictions 40, 60 also may include a frit, such as a sintered metal plate. Restrictions 40, 60 also may include an orifice, such as a sonic orifice in which the flow through the orifice is transonic. Alternatively, restrictions 40, 60 may include one or more baffles. It will be appreciated that the present invention is not limited to a particular type of restriction as other types of gas flow limiting devices, such as a valve configured to produce the desired pressure drop, may alternatively be used.

Restrictions 40, 60 should be selected to induce a pressure drop such that the flow meter sees sufficient outlet pressure to avoid causing calibration shift at the lowest usable flow and at nominal outlet pressure. Restrictions 40, 60 will then have a much higher pressure drop at full scale flow, but the pressure drop may still be acceptable. For example, assuming the pressure drop varies linearly with flow, a 5 Torr pressure drop at 1% of device full-scale flow becomes a 500 Torr drop at 100% of device full-scale flow. Although the gas which fills volume 70 will cause a change in the transient response of the flow meter, those skilled in the art will appreciate that the effect will disappear at steady state and can be accommodated in tuning parameters of gas process device 55.

During rapid inlet pressure changes, the flow rate through control valve 41 will change in proportion to the change in absolute pressure. For example, a rapid 2 pounds per square inch (psi) pressure drop and recovery on a line having a pressure of 50 pounds per square inch gauge (psig) will produce a change in flow of $2/65$ or approximately 3% at the peak of the transient. Where gas process device 55 is configures as a MFC, a pressure change such as this may produce a transient flow change of the same magnitude which may be corrected by MFC control circuitry in a fraction of the turn-on settling time of the MFC. These flow changes in response to pressure changes are several orders of magnitude lower than for a conventional downstream control valve MFC.

According to one aspect of the present invention, a pressure insensitive method for controlling a flow of a gas in a gas process device having an inlet and an outlet is provided. The pressure insensitive method of measuring a property of a gas includes receiving a flow of the gas at the inlet, dropping the pressure of the gas to produce a first reduced pressure gas and providing the first reduced pressure gas to a gas sensor. The method further includes measuring a property of the gas with the gas sensor, further dropping the pressure of the gas to produce a second reduced pressure gas and providing the second reduced pressure gas to the outlet of the gas process device. The acts of dropping the pressure may include reducing the pressure of the gas so that the flow of the gas is choked.

According to another aspect of the present invention, a method for ceasing gas flow in a controlled manner in gas process device is provided. The method includes acts of closing an inlet valve upstream of the gas process device, maintaining a predetermined drive to the control valve, and closing an outlet valve downstream of the gas process device when a flow rate of the gas drops below a predetermined value. This method may be performed, for example, with a flow control circuit (e.g., a microprocessor-based controller operatively coupled to an inlet valve (e.g., inlet valve 20), a control valve (e.g., control valve 41), a flow meter (e.g., gas sensor 50) and an outlet valve (e.g., outlet valve 80)). For example, the mass flow control circuit may be configured such that when it senses that the valve drive voltage provided to inlet valve 20 has reached a maximum value and flow has dropped below some threshold value, outlet valve 80 closes. The values and timing may be selected to close valve 80 as soon as the pressures in volumes 30 and 70 are essentially equal to the process outlet pressure. After valve 80 closes, the set point may be taken to zero so that the system (e.g., the flow control circuit, valves 20 and 80 and the gas process device 55) is ready to re-initiate flow at any time. The actual cessation of flow may lag the command by the time it takes the inventory in volumes 30 and 70 to discharge. These volumes may be small relative to the flow rate and so require only a fraction of a second to sufficiently discharge. This effect is more pronounced at lower flow rates, but the internal volumes 30 and 70 may be made small to minimize the effect. However, at very small flow rates, such as 5 standard cubic centimeters per minute (sccm), the lag may still be significant, particularly if the inlet pressure is high. As flow control circuits that may be used with this method of ceasing gas flow in a controlled manner are well known in the art, further details of the flow control circuit are omitted herein.

According to another aspect of the invention, a method is provided to initiate a gas flow in a controlled manner. The method for initiating a gas flow in a controlled manner in a gas process device includes acts of equalizing a first pressure upstream of a control valve and a second pressure downstream of the control valve with a third pressure downstream of a restriction, opening an inlet valve upstream of the gas process device and an outlet valve downstream of the gas process device, and opening the control valve to a position corresponding to a desired flow rate. One embodiment of a gas process device on which this method may be performed is illustrated in FIG. 1a. Where this method is performed on gas process device 55 of FIG. 1a, because the pressure in volumes 30 and 70 are essentially equal to the process outlet pressure, no outlet pressure surge occurs due to the release of gas which may be in volume 70 when outlet valve 80 opens. Equalizing the pressure across control valve 41 at turnoff makes leakage of control valve 41 inconsequential. Without such a pressure equalization, volume 30 would be at supply pressure when valves 20, 41 80 were closed. The pressure in volume 70, while initially close to process outlet pressure, would rise as the pressure in volume 30 leaked across control valve 41. The magnitude of the pressure "pop" if outlet valve 80 were opened under such circumstances might vary with the leakage of control valve 41 and the time since flow had last occurred. This sudden change in pressure may cause a "bad first wafer" effect in conventionally equipped process tools.

EXAMPLES

Example 1

To illustrate how embodiments of the present invention improve flow stability in a gas process device during upstream pressure changes, experiments were performed comparing the effect of an upstream pressure change on a conventional MFC and MFC according to an embodiment of the invention.

Figure 1B:
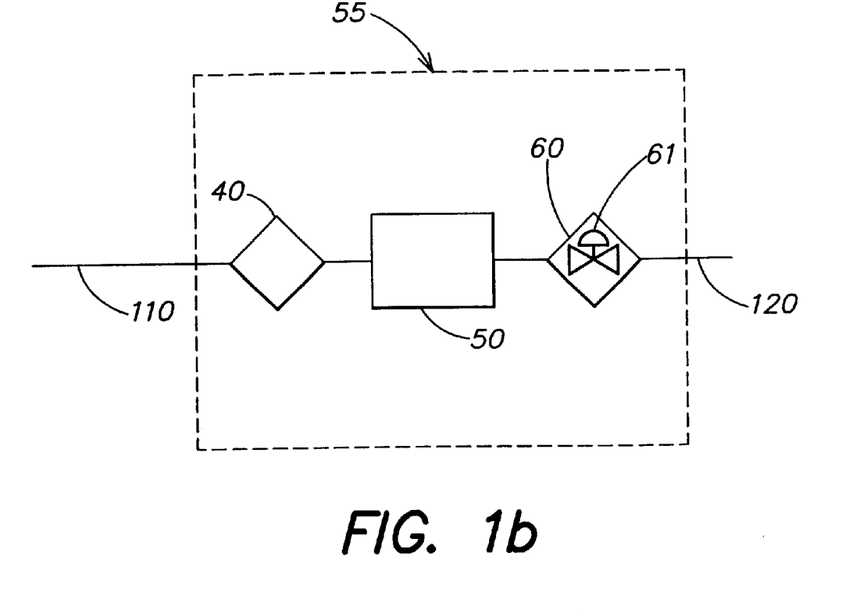
FIG. 1b is a schematic diagram of a gas process device according to another embodiment of the present invention.
Figure 1C:
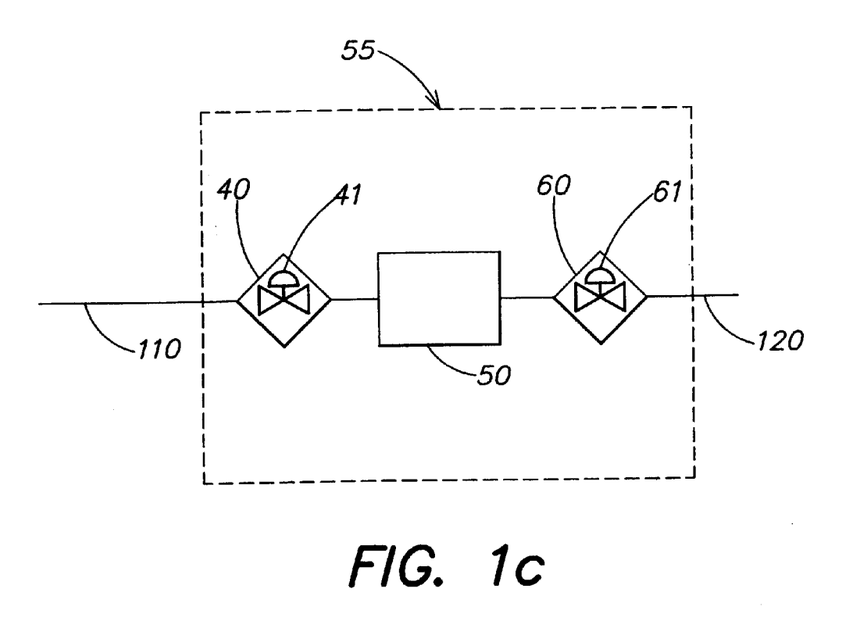
FIG. 1c is a schematic diagram of a gas process device according to another embodiment of the present invention.

The conventional MFC for these experiments included an inlet valve (e.g., input valve 20 in FIG. 1a) coupled to a bypass-type thermal mass flow meter (e.g., gas sensor 50 in FIG. 1a) disposed downstream of the input valve. The thermal mass flow meter was, in turn, coupled to a proportional metering valve (e.g., control valve 61 in FIG. 16) disposed downstream of the thermal mass flow meter.

For the MFC according to an embodiment of the invention, a gas panel similar to gas panel 100 illustrated in FIG. 1a was used. In this gas panel, inlet valves 10 and 20 were coupled to the inlet of a proportional metering valve 41. The outlet of proportional metering valve 41 was coupled to the inlet of a thermal mass flow meter (e.g., gas sensor 50) and the outlet of the thermal mass flow meter, in turn, was coupled to a restriction 60. Inlet valve 10 was a normally-closed solenoid valve. Inlet valve 20 was a standard valve. Restriction 60 was selected to maintain a 20 Torr pressure drop when passing 10% of device full-scale flow into a vacuum and was implemented as a transonic (orifice with two 0.006 inch holes in a 0.002 inch thick metal foil). In these tests the pressure drop of valve 41 was approximately 40 to 45 psi.

A steady state flow of 100 sccm of nitrogen gas was supplied through valve 20 at 25 psig to each MFC and the indicated flow rate (in volts) of each valve 41 was monitored. The pressure supplied to valve 10 was set to 30 psi and valve 10 was opened to create a pressure surge of about 5 psi over about 100 milliseconds (msec) in the gas supply of each MFC. The change in indicated flow rate of valve 41 was monitored before, during and after the pressure surge.

Figure 2A:
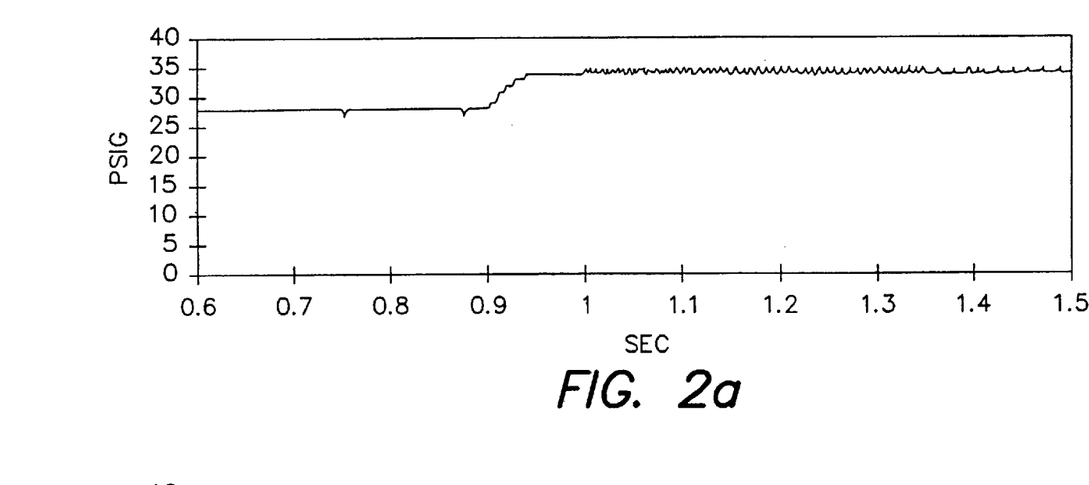
FIG. 2a is a graph of supply pressure versus time for a conventional mass flow controller.
Figure 2B:
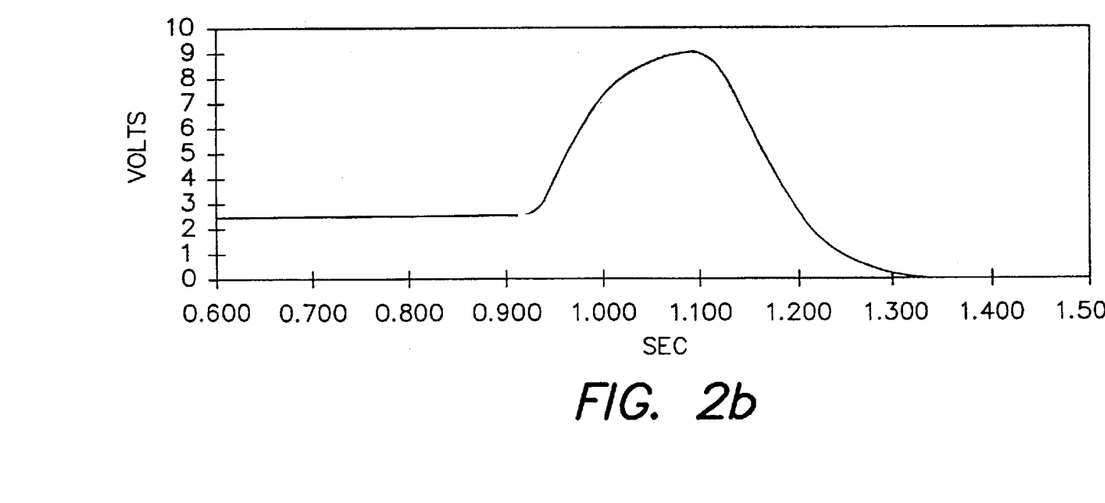
FIG. 2b is a graph of indicated flow rate versus time for a conventional mass flow controller.

FIGS. 2a and 2b are graphs of supply pressure (in psig) versus time (in seconds) and indicated flow rate through control valve 41 (in volts, where 5 volts corresponds to 100% of device full-scale flow) versus time (in seconds), respectively, for the conventional MFC. As can be seen from these graphs, the conventional MFC overcompensated for the pressure change by first dramatically increasing the indicated flow rate beyond full-scale flow and then sharply decreasing it. These dramatic changes result in similar changes in the flow rate out of the MFC, resulting in flow instability.

Figure 3A:
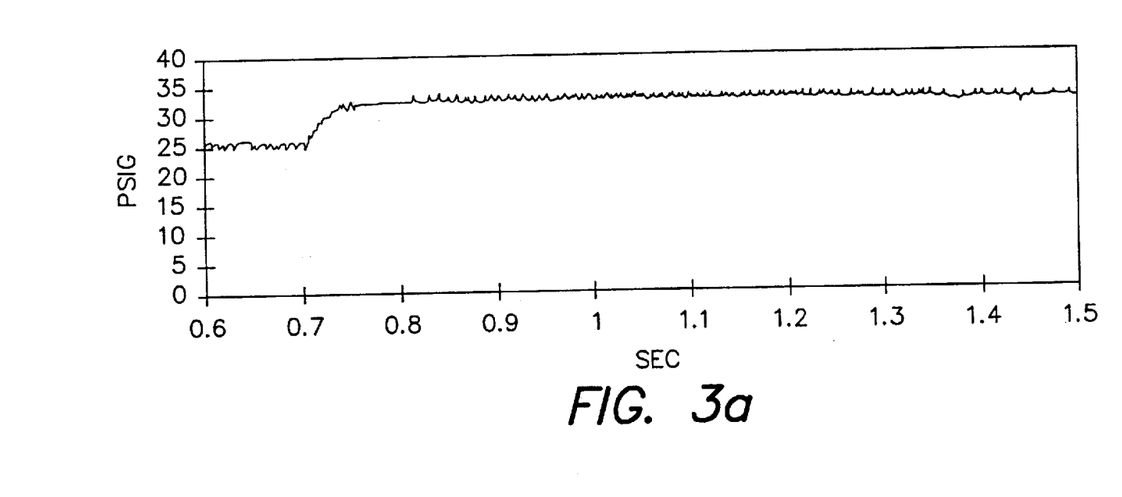
FIG. 3a is a graph of supply pressure versus time for a mass flow controller according to an embodiment of the present invention.
Figure 3B:
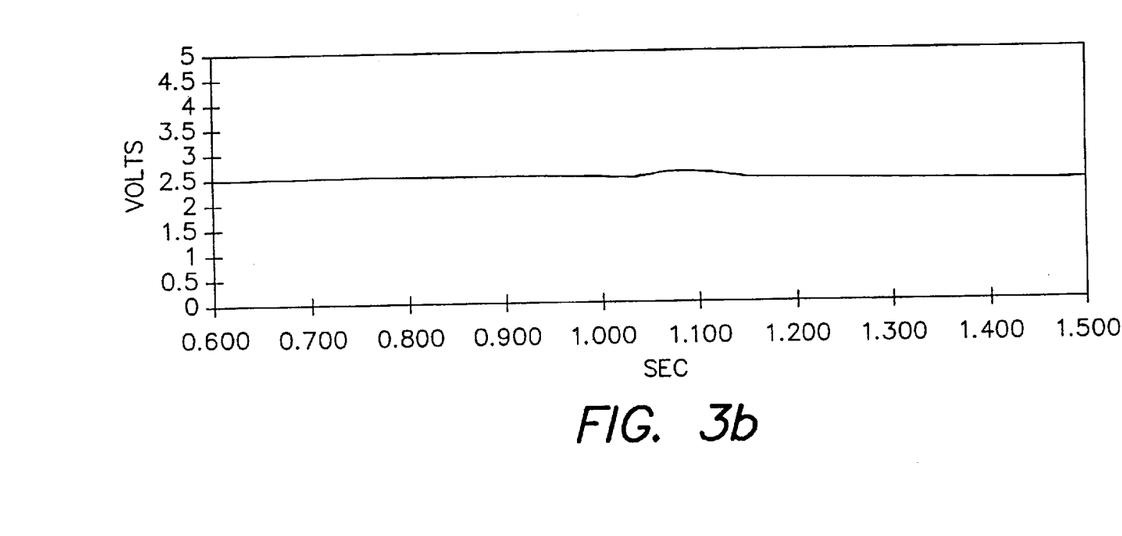
FIG. 3b is a graph of indicated flow rate versus time for a mass flow controller according to an embodiment of the present invention.

FIGS. 3a and 3b are graphs of supply pressure (in psig) versus time (in seconds) and indicated flow rate through control valve 41 (in volts, where 5 volts corresponds to 100% of device full-scale flow) versus time (in seconds), respectively, for the MFC according to an embodiment of the present invention. These graphs show that the MFC according to an aspect of the present invention experienced substantially no change in indicated flow rate through control valve 41, and thus substantially no flow instability, demonstrating that the present invention dramatically improves the flow stability of a MFC over conventional designs for upstream pressure changes.

Example 2

Figure 4A:
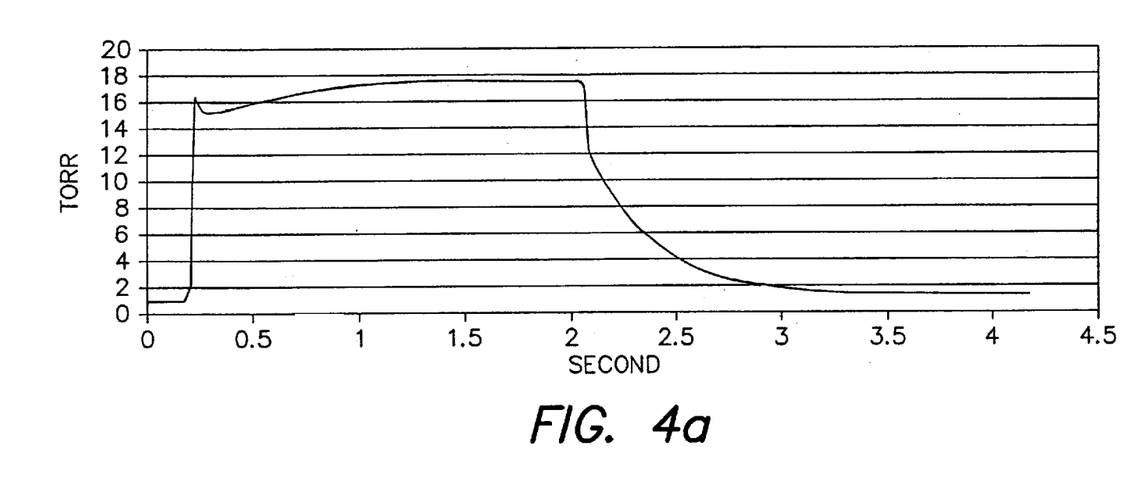
FIG. 4a is a graph of exhaust pressure versus time for a mass flow controller according to an embodiment of the present invention.

To determine the flow stability of a MFC according to an embodiment of the present invention during downstream pressure changes, flow stability experiments were performed. For the MFC according to an embodiment of the invention, a gas panel similar to gas panel 100 illustrated in FIG. 1a, and used in Example 1 was used, except that in the gas panel for Example 2, outlet valve 80 was coupled to the outlet of restriction 60 and outlet valve 80, in turn, was coupled to a vacuum pump and a pressure storage tank. The vacuum pump and the pressure storage tank were connected to the same point downstream of outlet valve 80. The pressure storage tank was equipped with a pneumatic valve which was operated indirectly by a solenoid. The pressure storage tank was initially filled with air at a pressure suitable for a downstream surge experiment. For example, for the experiment in which the results are shown in FIG. 4a, the pressure in the pressure storage tank was approximately 18 Torr.

Figure 4B:
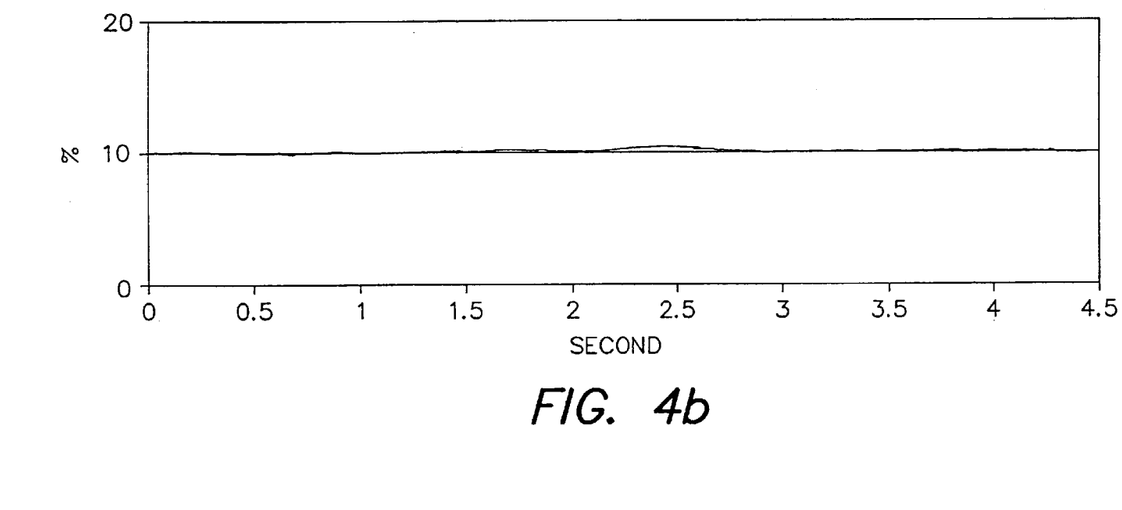
FIG. 4b is a graph of percentage of device full-scale flow versus time for a mass flow controller according to an embodiment of the present invention.
Figure 5A:
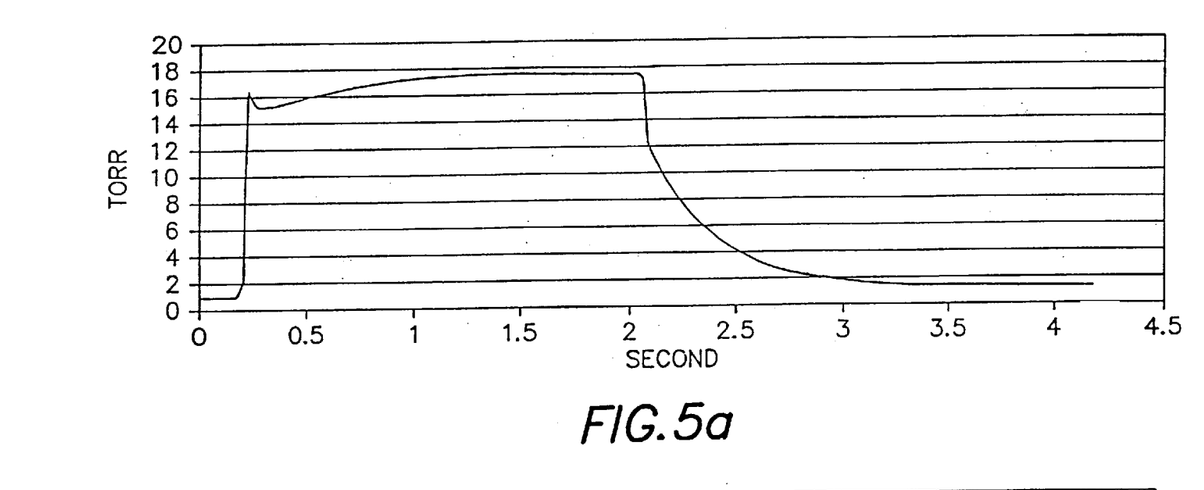
FIG. 5a is a graph of exhaust pressure versus time for a mass flow controller according to an embodiment of the present invention.
Figure 5B:
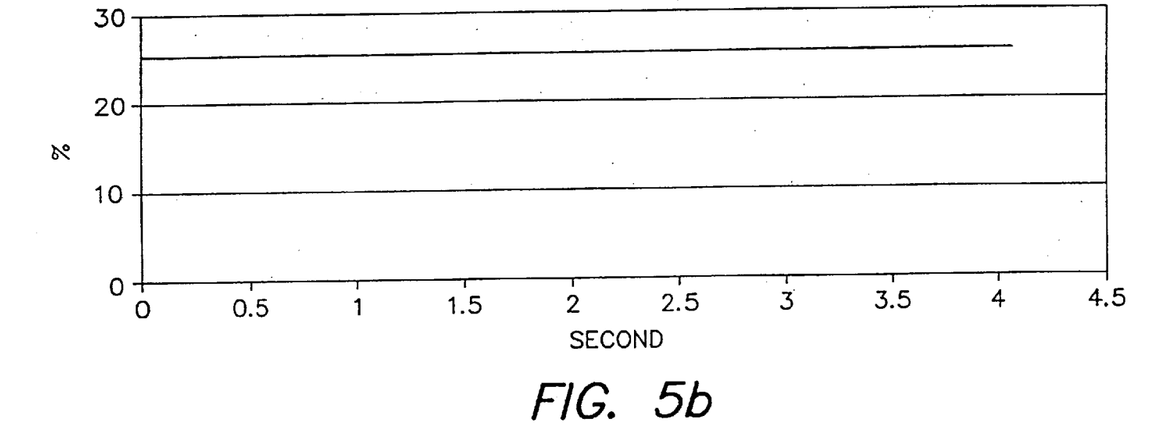
FIG. 5b is a graph of percentage of device full-scale flow versus time for a mass flow controller according to an embodiment of the present invention.
Figure 6A:
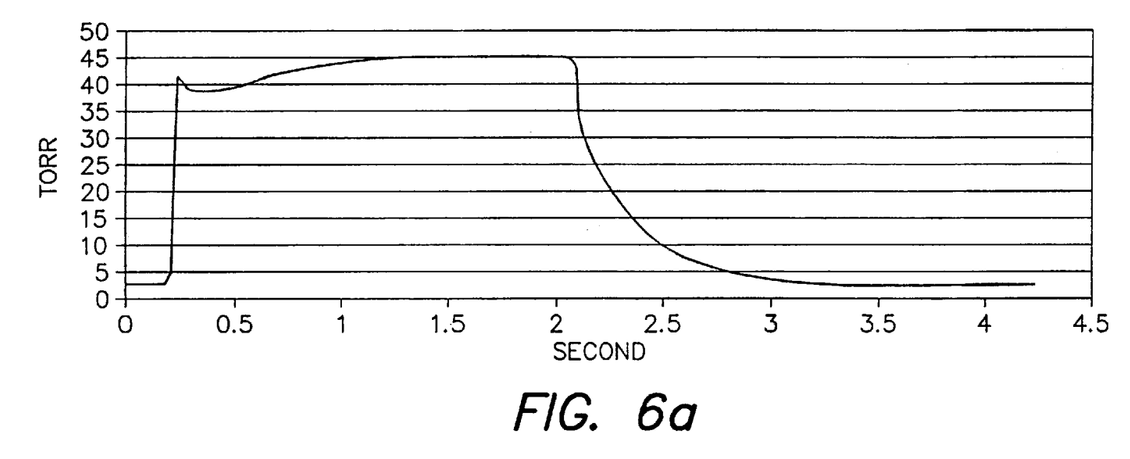
FIG. 6a is a graph of exhaust pressure versus time for a mass flow controller according to an embodiment of the present invention.
Figure 6B:
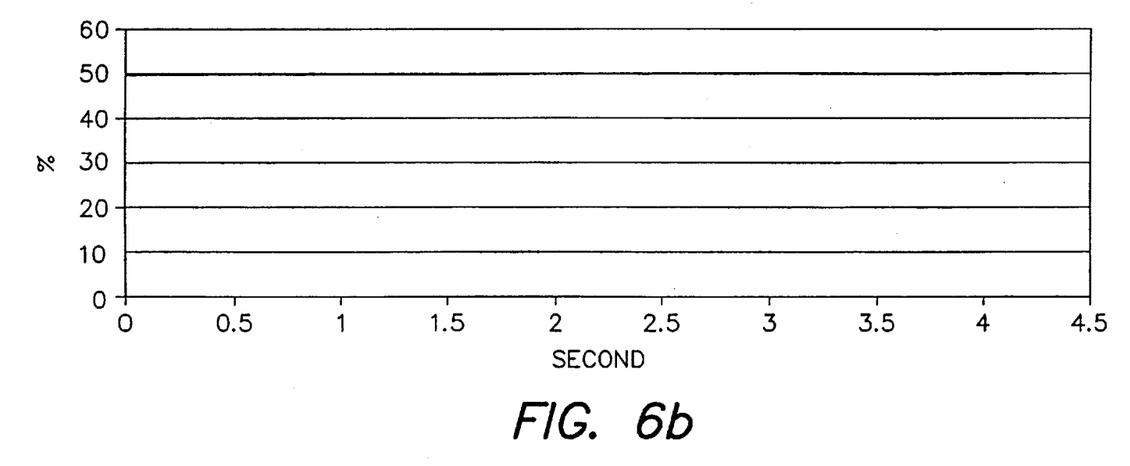
FIG. 6b is a graph of percentage of device full-scale flow versus time for a mass flow controller according to an embodiment of the present invention.
Figure 7A:
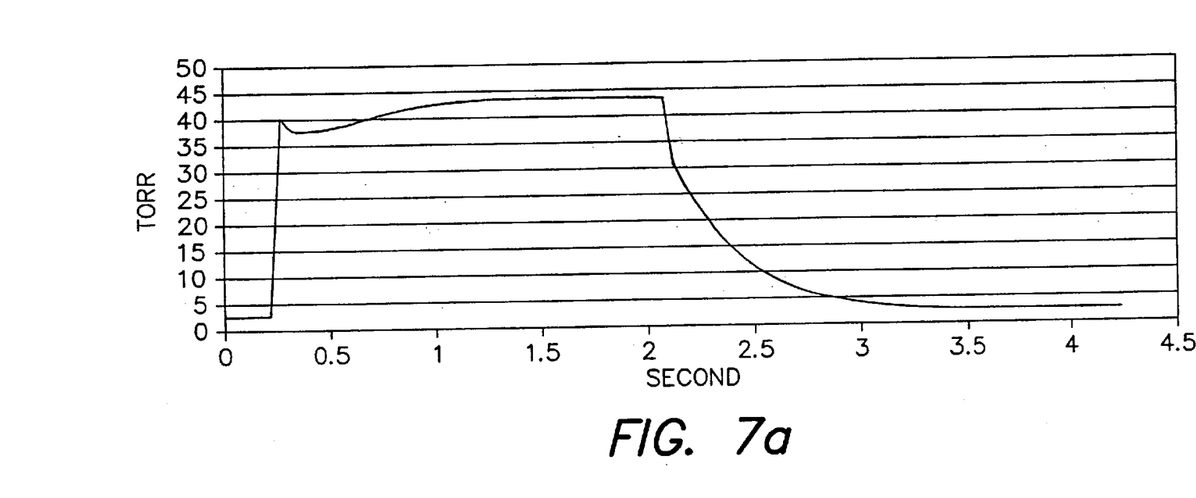
FIG. 7a is a graph of exhaust pressure versus time for a mass flow controller according to an embodiment of the present invention.
Figure 7B:
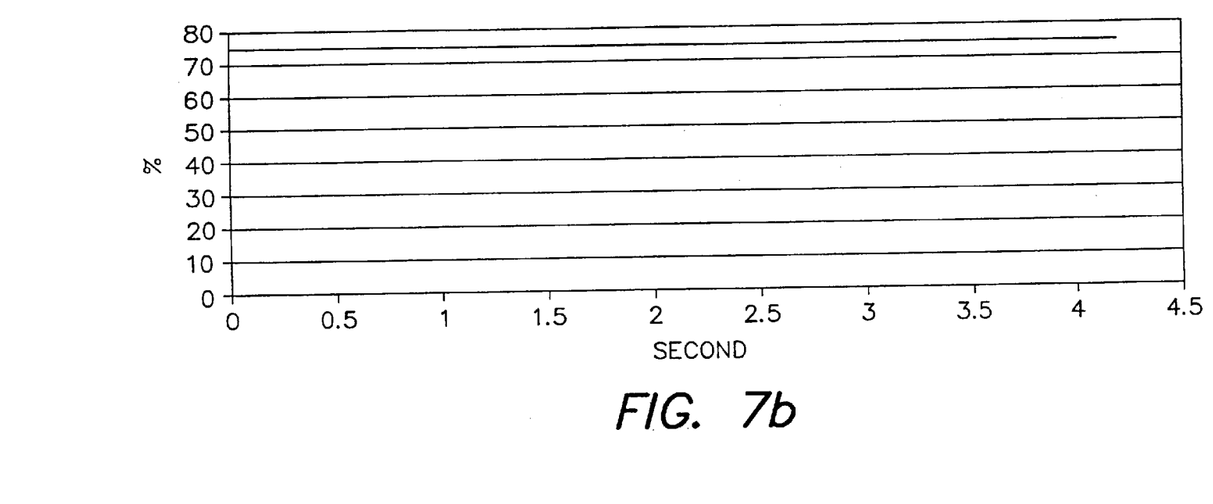
FIG. 7b is a graph of percentage of device full-scale flow versus time for a mass flow controller according to an embodiment of the present invention.

A steady state flow of 100 sccm of nitrogen gas supplied at about 7 psig was supplied through valve 20 and the flow through the MFC set to 10% of device full-scale flow. The steady state exhaust pressure was maintained at about 1 Torr. The exhaust pressure was then increased to about 18 Torr by opening the valve on the pressure storage tank for about 2 seconds and then closing it to return the downstream pressure to about 1 Torr. The effect of the change in the exhaust pressure on the percentage of device full-scale flow was monitored. FIGS. 4a and 4b are graphs of exhaust pressure (in Torr) versus time (in seconds) and percentage of device full-scale flow versus time (in seconds), respectively. These graphs show that the MFC according to an aspect of the present invention experienced substantially no change in percentage of device full-scale flow, and, thus, substantially no flow instability.

Figure 8A:
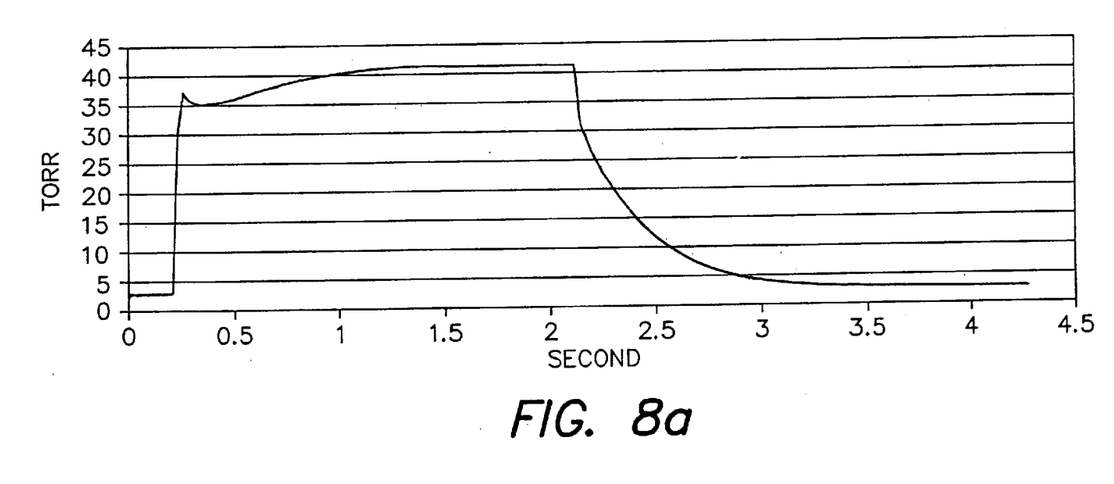
FIG. 8a is a graph of exhaust pressure versus time for a mass flow controller according to an embodiment of the present invention.
Figure 8B:
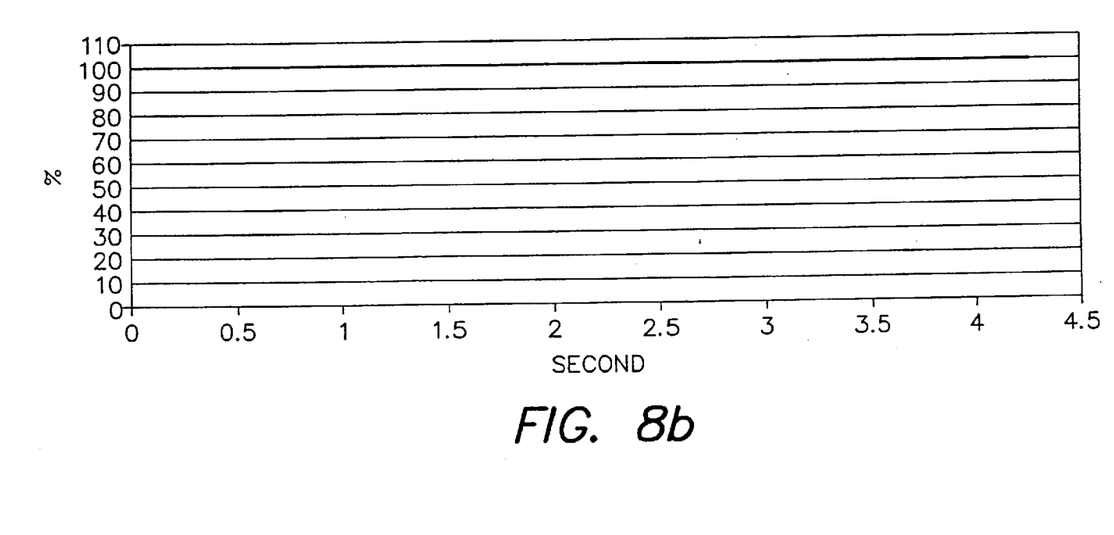
FIG. 8b is a graph of percentage of device full-scale flow versus time for a mass flow controller according to an embodiment of the present invention.

This experiment was repeated at 25% of device full-scale flow (FIGS. 5a and 5b), 50% of device full-scale flow (FIGS. 6a and 6b), 75% of device full-scale flow (FIGS. 7a and 7b) and 100% of device full-scale flow (FIGS. 8a and 8b). At 50%, 75% and 100% of device full-scale flow, the steady state exhaust pressure was about 2.5 Torr and the pressure surge was about 40 Torr. As shown in FIGS. 5a–8b, the MFC configured according to aspects of the present invention experienced substantially no change, in percentages of device full-scale flow, and, thus, substantially no flow instability at any of these percentages of device full-scale flow demonstrating that MFC according to aspects of the present invention is substantially insensitive to downstream pressure changes.

Although embodiments of the present invention have been predominantly described in terms of semiconductor processing equipment, it should be appreciated that the present invention is not so limited. In this regard, embodiments of the present invention may be used wherever the accurate control of fluids such as gases is desired.

It is to be understood that gas sensor 50 may include devices other than a flow meter, and that more than one gas sensor 50 may be employed. For example, other gas sensors which may be affected by pressure transients may be positioned between restriction 40 and restriction 60 instead of, or in addition to, a flow meter. Other gas sensors, for example, may include sensors for measuring water vapor in the gas stream and for performing other compositional analyses.

It will be understood that each of the elements described herein, or two or more together, may be modified or may also find utility in other applications differing from those described above. While particular embodiments of the invention have been illustrated and described. The present invention is not intended to be limited to the details shown, since various modifications and substitutions may be made without departing in any way from the spirit of the present invention as defined by the following claims.

What is claimed is:

1. A gas process device, comprising:
   a gas inlet;
   a gas outlet;
   a first restriction having an inlet and an outlet, the inlet of the first restriction being fluidly coupled to the gas inlet of the gas process device;
   a flow sensor having an inlet and an outlet, the inlet of the flow sensor being fluidly coupled to the outlet of the first restriction, the flow sensor being constructed to provide a flow signal indicative of a flow of gas through the gas process device; and
   a second restriction having an inlet and an outlet, the inlet of the second restriction being fluidly coupled to the outlet of the flow sensor and the outlet of the second restriction being fluidly coupled to the gas outlet of the gas process device;
   wherein one of the first restriction and the second restriction includes a control valve that. modulates the flow of gas through the gas process device based on the flow signal.

2. The gas process device of claim 1, wherein the flow sensor includes a thermal mass flow meter that provides a flow signal indicative of a mass flow rate through the gas process device.

3. The gas process device of claim 2, wherein the first restriction includes one of a frit, a filter, a sonic orifice, a baffle and a valve.

4. The gas process device of claim 3, wherein the second restriction includes at least one of a frit, a filter, a sonic orifice, a baffle and a valve.

5. The gas process device of claim 1, wherein the first restriction includes one of a frit, a filter, a sonic orifice, a baffle and a valve.

6. The gas process device of claim 5, wherein the first restriction is a frit formed from sintered particles.

7. The gas process device of claim 6, wherein the sintered particles are metal.

8. The gas process device of claim 5, wherein the second restriction includes at least one of a frit, a filter, a sonic orifice, a baffle and a valve.

9. The gas process device of claim 1, wherein the second restriction includes at least one of a frit, a filter, a sonic orifice, a baffle and a valve.

10. The gas process device of claim 9, wherein the second restriction is a frit formed from sintered particles.

11. The gas process device of claim 10, wherein the sintered particles are metal.

12. The gas process device of claim 9, wherein the flow sensor includes a thermal mass flow meter.

13. The gas process device of claim 1, further comprising a gas analyzer positioned between the first restriction and the second restriction.

14. The gas process device of claim 1, wherein the first restriction is constructed and arranged to provide a pressure ratio of more than about 1.25 to 1 from the inlet of the first restriction to the outlet of the first restriction.

15. The gas process device of claim 1, wherein the first restriction is constructed and arranged to provide choked flow of a gas.

16. A gas process device, comprising:
a gas inlet;
a gas outlet;
a first restriction having an inlet and an outlet, the inlet of the first restriction being fluidly coupled to the gas inlet of the gas process device;
a gas sensor having an inlet and an outlet, the inlet of the gas sensor being fluidly coupled to the outlet of the first restriction; and
a second restriction having an inlet and an outlet, the inlet of the second restriction being fluidly coupled to the outlet of the gas sensor and the outlet of the second restriction being fluidly coupled to the gas outlet of the gas process device;
   wherein the second restriction is constructed and arranged to provide a pressure ratio of more than about 1.25 to 1 from the inlet of the second restriction to the outlet of the second restriction.

17. The gas process device of claim 1, wherein the second restriction is constructed and arranged to provide choked flow of a gas.

18. A gas process device, comprising:
a gas inlet;
a gas outlet;
a flow sensor constructed to provide a flow signal representing a gas flow fluidly coupled to the gas inlet and the gas outlet; and
first and second means for inducing a pressure drop fluidly coupled between the gas inlet and the flow sensor and between the flow sensor and the gas outlet, respectively;
   wherein one of the first restriction and the second restriction includes a control valve constructed to receive a control signal at least partially based on the flow signal.

19. The gas process device of claim 18, wherein the flow sensor includes a thermal mass flow meter.

20. A gas process device, comprising:
a gas inlet;
a gas outlet;
a gas sensor fluidly coupled to the gas inlet and the gas outlet; and
first and second means for inducing a pressure drop fluidly coupled between the gas inlet and the gas sensor and between the gas sensor and the gas outlet, respectively;
   wherein at least one of the first and second means includes means for accelerating a gas flowing through the at least one of the first and second means to transonic speed.

21. The gas process device of claim 18, further comprising:
means, fluidly coupled between one of the first means and the flow sensor and the flow sensor and the second means, for analyzing a composition of a gas flowing through the gas process device.

22. The gas process device of claim 18, wherein the first means provides a pressure ratio of more than about 1.25 to 1 from an inlet of the first means to an outlet of the first means.

23. The gas process device of claim 18, wherein the first means includes means for providing choked flow of a gas.

24. A gas process device, comprising:
a gas inlet;
a gas outlet;
a gas sensor fluidly coupled to the gas inlet and the gas outlet; and
first and second means for inducing a pressure drop fluidly coupled between the gas inlet and the gas sensor and between the gas sensor and the gas outlet, respectively;
   wherein the second means provides a pressure ratio of more than about 1.25 to 1 from an inlet of the second means to an outlet of the second means.

25. The gas process device of claim 18, wherein the second means includes means for providing choked flow of a gas.

26. A pressure insensitive method of measuring a property of a gas in a gas process device having an inlet and an outlet, comprising acts of:
a) receiving a flow of the gas at the inlet;
b) dropping the pressure of the gas to produce a first reduced pressure gas;
c) providing the first reduced pressure gas to a flow sensor;

d) measuring a flow of the gas with the flow sensor;

e) further dropping the pressure of the gas to produce a second reduced pressure gas;

f) providing the second reduced pressure gas to the outlet; and g) regulating the flow of the gas based on act d with a control valve that also performs one of acts b and e.

27. The method of claim 26, wherein at least one of acts b and e includes reducing the pressure of the gas so that the flow of the gas is choked.

28. The method of claim 26, wherein the act g is performed prior to act d.

29. A pressure insensitive method of measuring a property of a gas in a gas process device having an inlet and an outlet, comprising acts of:

a) receiving a flow of the gas at the inlet;

b) dropping the pressure of the gas to produce a first reduced pressure gas;

c) providing the first reduced pressure gas to a gas sensor;

d) measuring a property of the gas with the gas sensor;

e) further dropping the pressure of the gas to produce a second reduced pressure gas;

f) providing the second reduced pressure gas to the outlet; and g) regulating the flow of the gas based on act d;
wherein act d is performed prior to the act of regulating.

30. A pressure insensitive method of measuring a property of at gas in a gas process device having an inlet and an outlet, comprising acts of:

a) receiving a flow of the gas at the inlet;

b) dropping the pressure of the gas to produce a first reduced pressure gas;

c) providing the first reduced pressure gas to a gas sensor;

d) measuring a property of the gas with the gas sensor;

e) further dropping the pressure of the gas to produce a second reduced pressure gas;

f) providing the second reduced pressure gas to the outlet; and g) regulating the flow of the gas based on act d;
wherein the act of regulating includes an act of regulating the flow of the gas with a proportional metering valve.

31. The method of claim 26, wherein act d includes an act of measuring a mass flow of the gas.

32. The method of claim 27, wherein at least one of acts b and e includes an act of reducing the pressure of the gas with an orifice.

33. A pressure insensitive method of measuring a property of a gas in a gas process device having an inlet and an outlet, comprising acts of:

a) receiving a flow of the gas at the inlet;

b) dropping the pressure of the gas to produce a first reduced pressure gas;

c) providing the first reduced pressure gas to a gas sensor;

d) measuring a property of the gas with the gas sensor;

e) further dropping the pressure of the gas to produce a second reduced pressure gas; and f) providing the second reduced pressure gas to the outlet;
wherein at least one of acts b and e includes reducing the pressure of the gas so that the flow of the gas is choked;
wherein at least one of acts b and e includes an act of reducing the pressure of the gas with an orifice; and
wherein at least one of acts b and e includes accelerating the gas to transonic speed.

34. The method of claim 26, wherein at least one of acts b and e includes passing gas through a plurality of small apertures.

35. The method of claim 26, wherein at least one of acts b and e includes an act of passing the gas through a filter.

36. A pressure insensitive method of measuring a property of a gas in a gas process device having an inlet and an outlet, comprising acts of:

a) receiving a flow of the gas at the inlet;

b) dropping the pressure of the gas to produce a first reduced pressure gas;

c) providing the first reduced pressure gas to a gas sensor;

d) measuring a property of the gas with the gas sensor;

e) further dropping the pressure of the gas to produce a second reduced pressure gas; and f) providing the second reduced pressure gas to the outlet;
wherein at least one of acts b and e includes an act of passing the gas one of through and over a baffle.

37. The method of claim 27, wherein at least one of acts b and e includes an act of reducing the pressure of the gas by approximately half.

* * * * *